US010462757B2

United States Patent
Ganesan et al.

(10) Patent No.: US 10,462,757 B2
(45) Date of Patent: Oct. 29, 2019

(54) AUTOMATIC GAIN CONTROL BASED ON SIGNAL SPECTRUM SENSING

(71) Applicant: Signalchip Innovations Private Limited, Bangalore (IN)

(72) Inventors: Aravind Ganesan, Bangalore (IN); Himamshu Gopalakrishna Khasnis, Bangalore (IN)

( * ) Notice: Subject to any disclaimer, the term of this patent is extended or adjusted under 35 U.S.C. 154(b) by 0 days.

(21) Appl. No.: 15/259,017

(22) Filed: Sep. 7, 2016

(65) Prior Publication Data

US 2017/0070966 A1 Mar. 9, 2017

(30) Foreign Application Priority Data

Sep. 7, 2015 (IN) .......................... 4735/CHE/2015

(51) Int. Cl.
*H04W 52/52* (2009.01)
*H04L 27/26* (2006.01)
*H04B 17/373* (2015.01)
*H04B 17/391* (2015.01)

(52) U.S. Cl.
CPC .......... *H04W 52/52* (2013.01); *H04B 17/373* (2015.01); *H04B 17/3911* (2015.01); *H04L 27/2647* (2013.01)

(58) Field of Classification Search
CPC ..... H04W 24/02; H04W 88/00; H04W 84/00; H04W 84/12; H04B 17/345; H04B 117/336; H04L 25/00; H04L 5/00; H04L 1/248; H04L 47/29; H04L 45/745
See application file for complete search history.

(56) References Cited

U.S. PATENT DOCUMENTS

| | | | |
|---|---|---|---|
| 9,280,982 B1* | 3/2016 | Kushner | G10L 21/02 |
| 2007/0258548 A1* | 11/2007 | Sutton | H03G 3/3052 375/345 |
| 2009/0061798 A1* | 3/2009 | Rofougaran | H03G 3/3078 455/127.2 |
| 2014/0307565 A1* | 10/2014 | Samarasooriya | H04B 1/18 370/252 |
| 2015/0162047 A1* | 6/2015 | Lacirignola | G10L 21/0208 700/94 |

* cited by examiner

*Primary Examiner* — Jean B Corrielus
(74) *Attorney, Agent, or Firm* — The Law Office of Austin Bonderer, PC; Austin Bonderer

(57) ABSTRACT

Disclosed herein is a method for automatic gain control based on signal spectrum sensing. Spectral sensing techniques may be employed to detect the presence or absence of interference and also determine a frequency location of the interference and power level estimates of a desired signal. The method includes running an algorithm to measure the energy periodically to track the changes as blockers that were not prominent while experiencing deep fade and those that will affect performance when it is out of the deep fade. The method enables predicting a level of degradation for various front-end settings and enables selection of an optimum setting. In an embodiment, the spectral sensing may be performed either in analog domain using narrow-band tunable filters. In an embodiment, the spectral sensing may be performed digitally using Fast fourier transform (FFT), Goertzel algorithm, or power detection techniques.

9 Claims, 8 Drawing Sheets

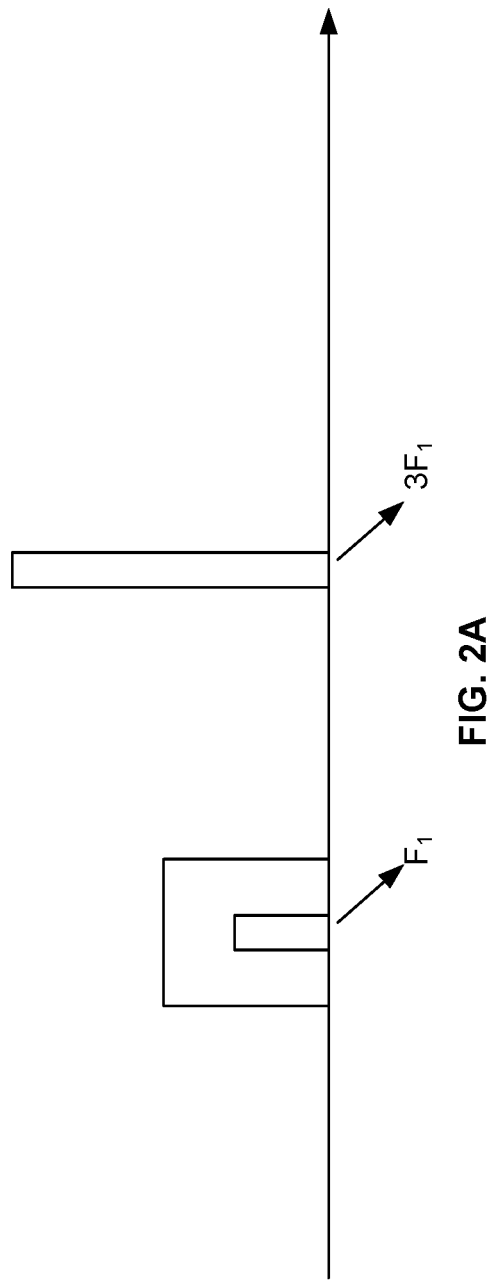

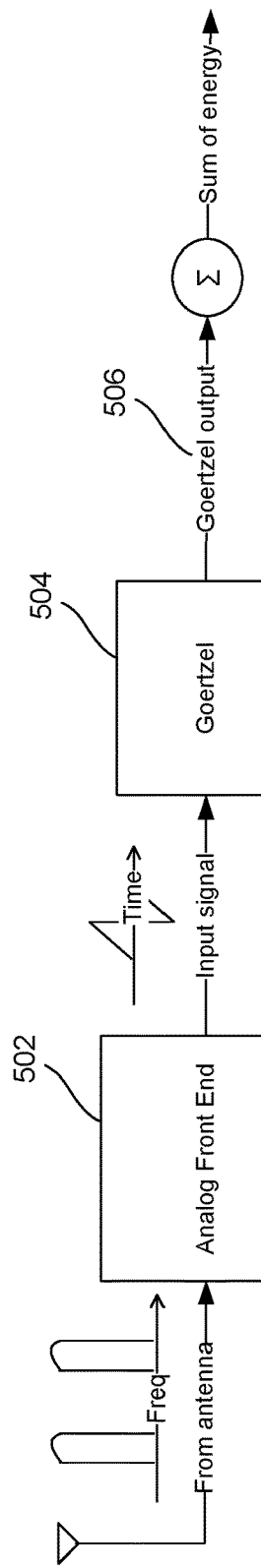
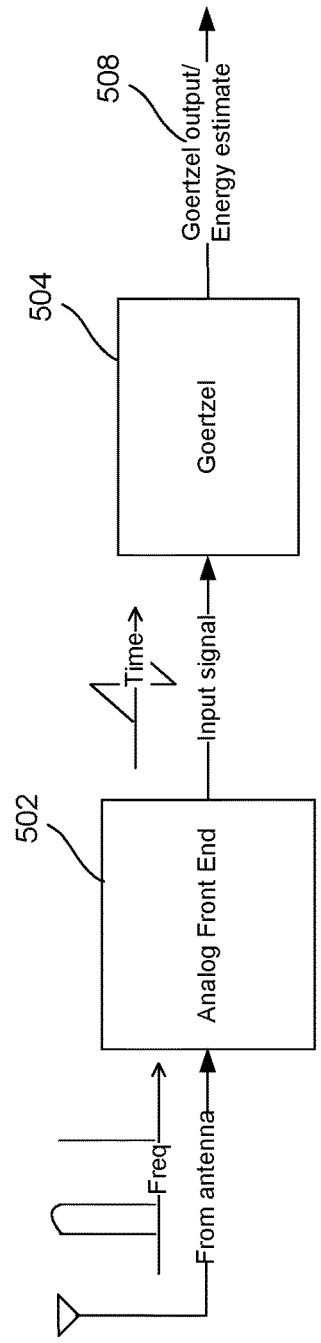
FIG. 5A
FIG. 5B

AUTOMATIC GAIN CONTROL BASED ON SIGNAL SPECTRUM SENSING

CROSS-REFERENCE TO RELATED APPLICATIONS

This application claims priority to Indian patent application no. 4735/CHE/2015 filed on Sep. 7, 2015, the complete disclosure of which, in its entirely, is herein incorporated by reference.

BACKGROUND

Technical Field

The embodiments herein generally relate to spectrum analyzer, and, more particularly, to a method and system for automatic gain control based on signal spectrum sensing using a Fast Fourier Transform (FFT) analysis, a Goertzel analysis, and a power level estimate.

Description of the Related Art

Many current and future generations of communication devices, such as mobile handsets, ultra mobile devices (UMD) and laptop PCs (Personal Computer) have wireless transmitters and/or receivers of different communication technologies integrated into a single or same host device. These communication technologies may involve, for example, cellular radio technologies, such as GSM (Global System for Mobile communication), PCS (Personal Communications Services) and 3rd generation mobile radio technologies, as well as other communication technologies, such as WLAN (Wireless Local Area Network) and/or WiMAX (Worldwide Interoperability for Microwave Access) and/or DVB (Digital Video Broadcasting) radio technologies and/or Bluetooth technologies.

Analog amplification or attenuation is typically needed in a receiver path of digital modems to fully utilize the available digital dynamic range. Most often, the gain adjustment depends on the particular channel conditions, therefore, automatic gain control may be preferable. In cases where all the analog filtering is performed before all programmable gain attenuation/amplification stages, the task of an automatic gain controller is greatly simplified as saturation conditions at the output of the filtering stages are readily observable in the digital domain. When the gain attenuation and filtering stages are interleaved (typical in integrated analog front ends) the automatic gain controller problem is a more tedious to deal with since in most environments, the intermediate points in the receive path are inaccessible.

SUMMARY

In view of the foregoing, an embodiment herein provides a method for automatic gain control based on signal spectrum sensing and reconstruction is provided. The method includes the following steps: (i) receiving a signal through one or more analog front end chains and one or more digital front end chains, (ii) estimating an energy of the input signal in a frequency domain, (iii) optionally removing ambiguity of frequency location of one or more signal components, (iv) reconstructing a signal power profile of the input signal at one or more locations with knowledge of a filtering response of signal processing chains, and (v) selecting optimum mode using reconstructed signal power profile and knowledge of a circuit non linearity.

In one embodiment, the energy estimates in the frequency domain is computed using one or more of following methods: (i) a fast fourier transform(FFT) module that (a) receives the input signal that is processed by the one or more analog front end chains, (b) detects energy at each of one or more frequency bins, and (c) detects interference power by summing the energy of the one or more frequency bins, (ii) a Goertzel algorithm module that (a) receives the input signal that is processed by the one or more analog front end chains, (b) estimates energy of one or more selected frequency bins, (c) detects energy estimate of the interfering signal by adding the one or more energy measured at different frequency bins; and (iii) an energy estimation module at different stages in the one or more analog front end chains and the one or more digital front end chains that (a) receives the input signal that is processed by the one or more analog front end chains, (b) estimates energy at one or more tap off points in the signal chain, and (c) estimate the energy distribution of the input signal. In another embodiment, the ambiguity in a actual frequency of the signal is removed by relating the signal whose frequency measured after sampling appears in an invalid region and further whose real frequency value is mapped to most likely valid transmit frequency by considering other aliasing frequencies.

In yet another embodiment, the energy estimation module further estimates a power level at any node in the signal by undoing response of filter chain from the energy of the signal estimated by the FFT module. In yet another embodiment, the Goertzel algorithm includes one or more programmable controls to (a) control (i) a frequency resolution computation, and (ii) at least one frequency bin for which a frequency transform is to be computed, and (b) sum multiple frequency bins. In yet another embodiment, the energy estimation module further detects an interference frequency location at the one or more tap off points in the signal chain. In yet another embodiment, the coarse energy distribution of the input signal is estimated by (i) estimating a energy of the signal at output of each of one or more tap off points, (ii) estimating a energy of the signal at input of each of the one or more tap off points, and (iii) comparing the energy estimated at the output of each of the one or more tap off points with the energy estimated at the input at each of the one or more tap off points to estimate the energy distribution of the input signal. In yet another embodiment, the energy estimation module determines (i) an exact location of occurrence of loss of energy and (ii) location of the interference frequency by comparing the measured energy at input and output of each of the one or more filtering stages. In yet another embodiment, the optimum mode for the gain control uses one or more of the following: (i) maximum drive strengths of different nodes in a circuit as either RMS or amplitude, and (ii) presence of the energy at locations which would cause higher order products to distort signal of interest.

In another aspect, an automatic gain control system is provided. The system includes one or more analog front end chains and one or more digital front end chains, a Fast Fourier Transform (FFT) module, a Goertzel algorithm module that, an energy estimation module. The one or more analog front end chains and the one or more digital front end chains that receive a signal. The fast fourier transform(FFT) module that (i) receives the input signal that is processed by the one or more analog front end chains, (ii) detects energy at each of one or more frequency bins, (iii) detects an interference power by summing the energy of the one or more frequency bins. The FFT module further estimates a power level at any node in the signal by undoing response of filter chain from the energy of the signal estimated by the FFT module. The Goertzel algorithm module that (i) receives the input signal that is processed by the one or more analog front end chains, (ii) estimates energy of one or more selected frequency bins, and (iii) detects energy estimate of the interfering signal by adding the one or more energy measured at different frequency bins. The energy estimation module at different stages in the one or more analog front end chains and the one or more digital front end chains that (i) receives the input signal that is processed by the one or more analog front end chain, (ii) estimates energy at one or more tap off points in the signal chain, (iii) estimate the energy distribution of the input signal.

In one embodiment, the system further (i) removes ambiguity of a frequency of one or more signal components, (ii) reconstructs a signal power profile of the input signal at one or more locations with knowledge of a filtering response of signal processing chains, and (iii) selects optimum mode using reconstructed signal power profile and knowledge of a circuit non linearity. In another embodiment, the optimum mode is determined based on determination of the locations of the interference signal and the signal power profile and the knowledge of the circuit non linearity. In yet another embodiment, the ambiguity in an actual frequency location of the signal is removed by relating the signal whose frequency measured after sampling appears in an invalid region and further whose real frequency value is mapped to most likely valid transmit frequency by considering other aliasing frequencies. In yet another embodiment, the system further includes a decimation filter chain that (i) estimates a energy of the signal at output of each of one or more tap off points, (ii) estimates a energy of the signal at input of each of the one or more tap off points, (iii) compares the energy estimated at the output of each of the one or more tap off points with the energy estimated at the input at each of the one or more tap off points to estimate the energy distribution of the input signal. In yet another embodiment, the system further determines (i) an exact location of occurrence of loss of energy, and (ii) location of the interference frequency by comparing the measured energy at input and output of each of the one or more filtering stages.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 2A and 2B illustrate a degradation of signal due to a blocker intermodulation in accordance with an embodiment;

FIGS. 5A and 5B illustrates an interference frequency detection using a Goertzel algorithm according to an embodiment herein.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
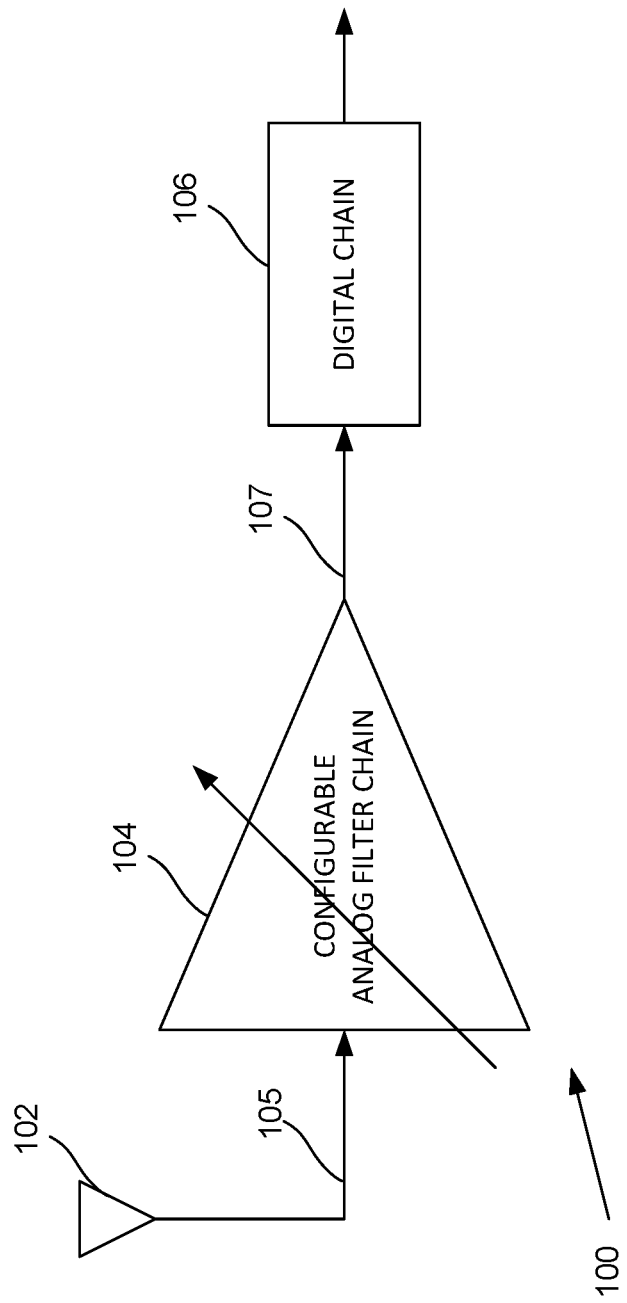
FIG. 1 is a block diagram of a typical receiver architecture, in accordance with an exemplary scenario.

A typical receiver architecture is shown in FIG. 1. The architecture 100 as depicted in FIG. 1 represents a typical receiver implementation, in accordance with an exemplary scenario. An analog filter chain 104 receives an RF signal 105 from a transmission station through an antenna 102. An output signal 107 from the analog filter chain 104 maybe non-linear under moderate to high signal conditions. The non-linearity in the output signal 107 causes intermodulation products that may fold back into desired signal bandwidth. The linearity of the chain may for example be important when the intermodulation product falls within the desired signal bandwidth.

Disclosed herein is a method for automatic gain control based on signal spectrum sensing using a Fast Fourier Transform (FFT) analysis, a Goertzel analysis, and/or a power level estimate at a receiver, in accordance with an embodiment. An analog front-end performance is governed by a two quantities namely: (i) gain, and (ii) linearity. These two quantities typically come at the expense of each other and hence circuits can be operated in modes such as high-linearity along with low gain or low-linearity along with high-gain. In circumstances where degradation of the desired signal quality due to the intermodulation product overlapping is involved, it would be advantageous to operate the front end chain in a high linearity mode compared to high gain mode. Typically, analog impairment may be caused due to intermodulation due to the circuit non-linearity.

Pursuant to an exemplary scenario, two kinds of energy measurements may be required in an automatic gain control (AGC) to overcome the effect of intermodulation. One measurement is used to determine if the reception of the desired signal will be affected by the presence of an interfering signal at specific frequency locations. A second measurement may be used to get a better estimate of signal energy at various points in the signal chain after taking into account the filtering characteristics of the signal chain. Various embodiments of the system and method disclosed herein employ one or more spectral sensing techniques to detect the presence or absence of interference and also determine a frequency location of the interference and power level estimates of the desired signal. More particularly, in situations where the interference scenario is changing as a function of time (for example when a blocker experiences fading and its power level changes as a function of time), the system disclosed herein runs an algorithm to measure the energy periodically to track the changes as blockers that were not prominent while experiencing deep fade and those that will affect performance when it is out of the deep fade. The system and method disclosed herein enables predicting a level of degradation for various front-end settings and enables selection of an optimum setting. In an embodiment, the spectral sensing may be performed either in analog domain using narrowband tunable filters. In another embodiment, the spectral sensing may be performed digitally using Fast fourier transform (FFT), Goertzel algorithm, or power detection techniques. In an embodiment, if the frequency locations to be sensed are known and are limited within a predetermined range, then a single shot measurements using Goertzel may be used for low complexity sensing. In an embodiment, if the frequency location to be sensed includes one or more frequency bins then FFT may be employed.

Figure 2B:
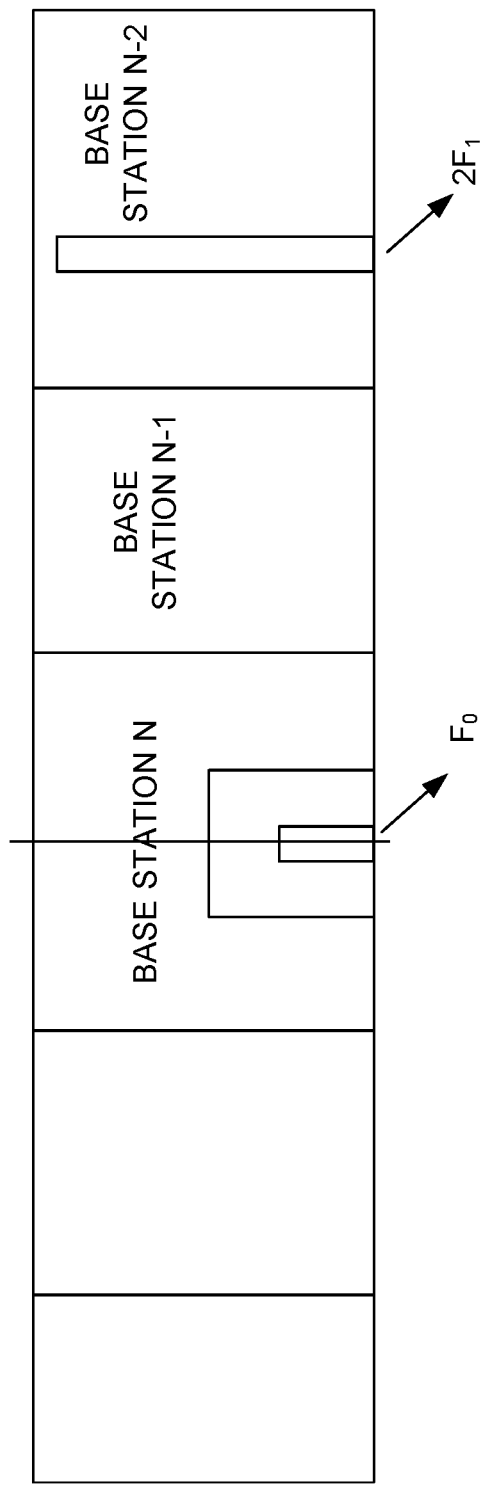

FIGS. 2A and 2B depict degradation of signal due to a blocker intermodulation in accordance with an embodiment. As depicted in FIG. 2A, the frequency F1 is overlapped by an intermodulation product that causes degradation of the desired signal and 3F1 is an interference frequency which is three times higher than a desired signal frequency F1. Typically, the circuits in a receiver are required to be linear over the operating region. This requires the circuit to cause no impairment to a desired signal except for a Gain and filtering of undesired components. But a practical circuit design requires a balance between the linearity and the power consumed by the circuit. The non-linearity is typically modeled as higher order terms (e.g., $2^{nd}$ and $3^{rd}$ order terms etc.) of an input signal (e.g. $y(t)=k_1x(t)+k_2x^2(t)+k_3x^3(t)+\ldots k_Kx^k(t)+$). With a presence of one tone in the signal, the higher order terms cause the signal energy to be generated at DC or integer multiples of a tone frequency. With a presence of two tones in the signal (e.g. (a) desired signal, and (b) the blocker), the inter tone modulation products may fall back into a desired tone when the frequency of the blocker has a specific relationship with the frequency of the desired signal. The intermodulation may be extended to signals that are modulated, wherein the tones to be considered in many pairs which satisfy a particular relationship. FIG. 2B depicts frequencies as depicted in FIG. 2A shifted by F1 to bring a desired signal to a baseband. As depicted in FIG. 2B, the frequency of the desired signal is 0 Hz and the interference is at 2F1 and the non-linearity induced distortion folds back over the desired signal.

In an embodiment, spectral sensing techniques may be used to detect the presence or absence of an interference and also know the frequency location of the interference. In an embodiment, along with frequency location of interference(s), a power level estimate of the desired signal and interference may be determined using spectral sensing techniques to predict the level of degradation for various front-end settings and pick an optimum setting. Spectral sensing may be performed either in analog domain using narrowband tunable filters or digitally using FFT, Goertzel algorithm, energy measurements/power level estimation. If the frequency locations to be sensed are known, then a single shot measurement using Goertzel can be used for low complexity sensing. In an embodiment, if the frequency location to be sensed includes one or more frequency bins then FFT may be employed.

Two kinds of energy measurements/power level estimations are required in the AGC as a part of the spectral sensing. In one embodiment, the energy estimation done by an energy estimation module. A first energy measurement may be used to determine if a reception of the desired signal will be affected by the presence of an interfering signal at specific frequency location and another energy measurement may be used to get a better estimate of signal energy at various points in the signal chain after taking into account the filtering characteristics of the signal chain. In situations where the interference scenario is changing as a function of time (for example when a blocker experiences fading and its power level changes as a function of time), the algorithm to measure the energy/power level estimate is run periodically to track the changes as blockers that were not prominent while experiencing deep fade may affect performance when it is out of the deep fade. In one embodiment, a coarse spectral sensing (sensing spectral content of input signal) may be performed using power detection at different stages (analog/digital). In one embodiment, the energy estimation module further detects an interference frequency location at various tap off points in the signal chain.

Figure 3:
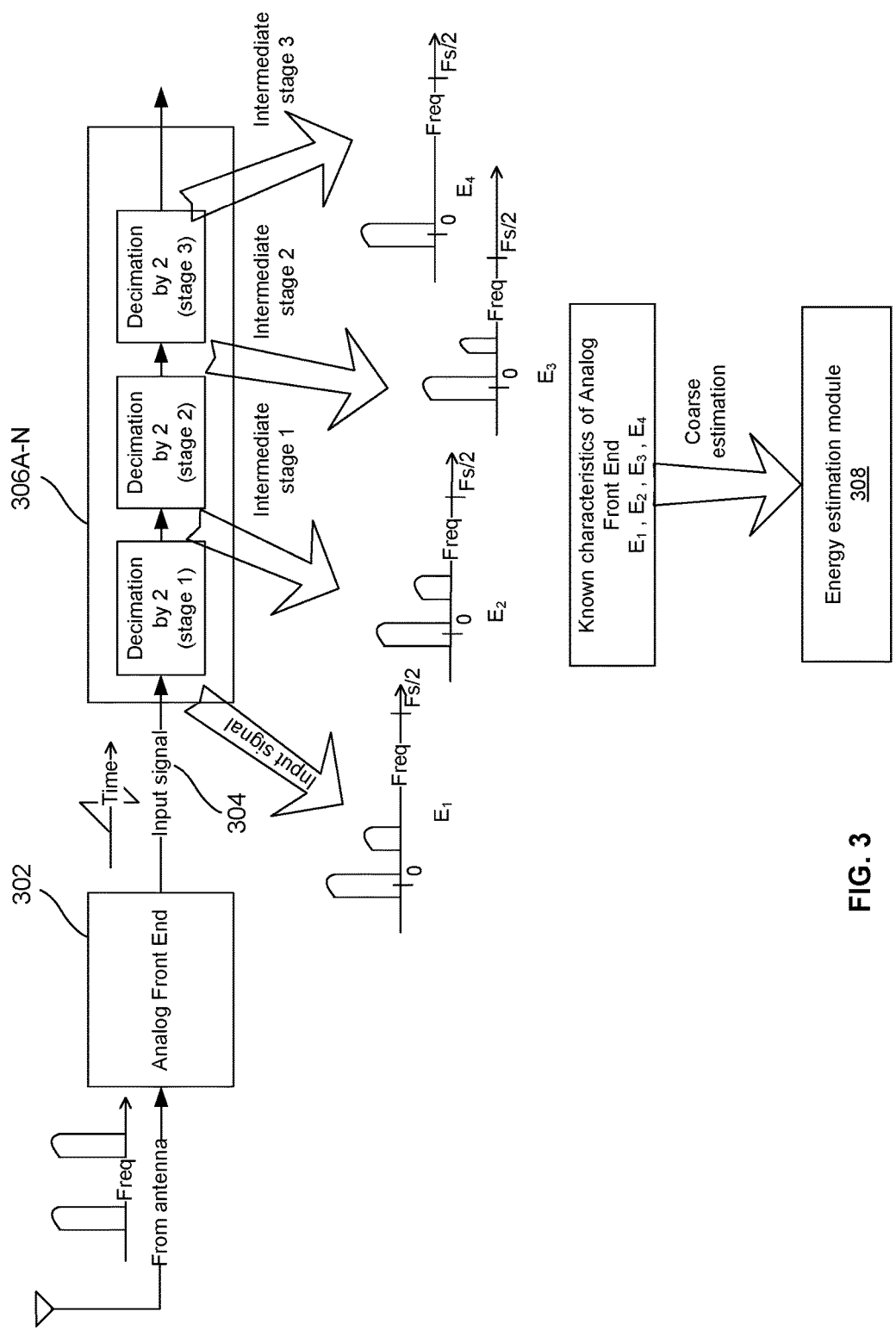
FIG. 3 illustrates decimation filter stages, in accordance with an embodiment.

In case of oversampled analog to digital converters (ADCs), a decimation chain is used to change the ADC sampling rate to processing sampling rate. FIG. 3 depicts decimation filter stages, in accordance with an embodiment. The decimation filter chain includes a series of anti-alias filters and decimation stages 306A-N(i.e. one or more digital front end chains 306A-N). The anti-alias filters remove the signal content in an aliasing band. The one or more signal decimation stages or one or more digital front end chain 306A-N receives an input signal 304 from an analog front end 302. The energy at the output of each of the stages can be measured and compared with the energy at the input at each of the stages to determine a coarse distribution of energy in the received input signal 304 and aid the AGC operation. In one embodiment, energy at the input of each stage can be measured. The energy estimates E1, E2, E3, and E4 at various stages of decimation filtering stage (306A-N) is determined at input, intermediate stage 1, an intermediate stage 2, and an intermediate stage 3 respectively. The optimum mode is selection of set of gain values in the different intermediate stages of gains such that a Signal to Noise Ratio (SNR) of the received signal (e.g. the input signal) is maximized. The coarse estimation is done by comparing the energy estimates of analog front end with the energy estimates E1, E2, E3, and E4 using an energy estimation module 308.

The filters (analog/digital) in the signal path attenuate (or amplify) signal power as a function of frequency. Since the filter response of the circuit is known, the effect of filtering is undone to reconstruct the spectral profile and estimate the actual signal power at different points in the filter-chain. This enables a finer control of the analog chain wherein each of the blocks of interest can be individually configured to the best possible setting. By measuring and comparing energy at various stages we may also determine the exact location of occurrence of the loss of energy and hence locate the interference frequencies. In some cases where coarse estimation based on energy estimation may be more than enough and the usage of FFT or Goertzel may be avoided. The energy comparison at various input and output stages as described above used to determine the location of the blocker/interference frequency. In one embodiment, the energy comparison at various input and output stages as described above may also be used to determine an exact location of occurrence of loss of energy.

Figure 4:
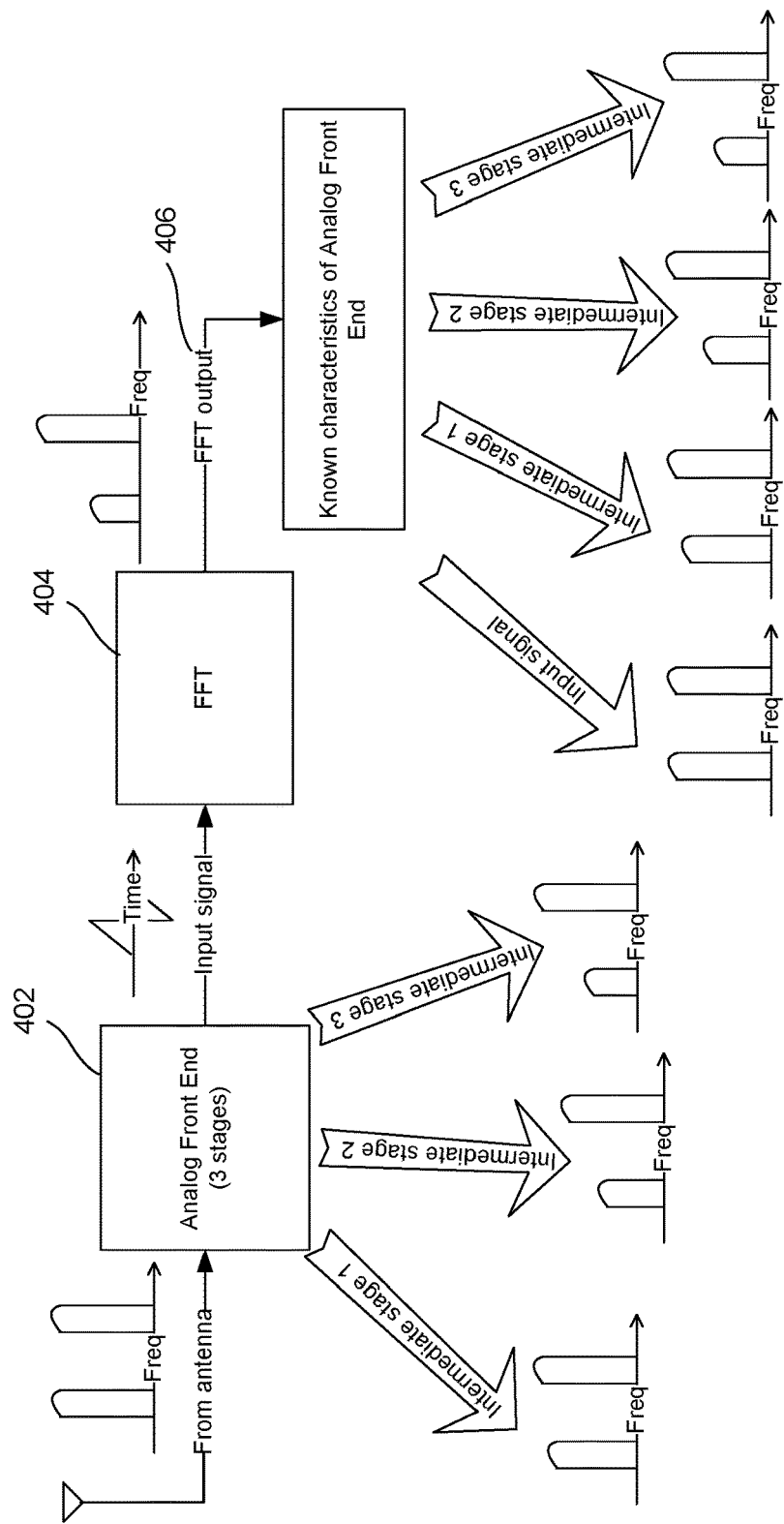
FIG. 4 illustrates an interference frequency detection using a Fast Fourier Transform according to an embodiment herein.

FIG. 4 illustrates energy level estimation of a signal using a Fast Fourier Transform according to an embodiment herein. The signal is transmitted and received through an antenna. The output of the Fast Fourier Transform (FFT)/FFT module 404 is used to estimate the power level at intermediate stages of interest. As shown in FIG. 4, an analog front end 402 may have three stages, an intermediate stage 1, an intermediate stage 2, and an intermediate stage 3. In one embodiment, the FFT 404 receives signal through one or more analog front ends. The input signal from the last stage of the analog front end 402 is subjected to the FFT 404. The FFT 404 detects component of the input signal present at each of the frequency bins. In one embodiment, the output of FFT 404 is used to detect an interference frequency from the entire frequency bins locations. The known characteristics of the analog front end 402 are determined from simulations or characterization. The process of identifying the interference is achieved using an FFT module in a receiver end. In one embodiment, the FFT 404 is performed in the digital domain. The FFT 404 detects frequency of interference(s) along with power level estimates of a desired signal and interference. In one embodiment, the FFT 404 estimates a power level of the signal at any node by undoing response of filter chain from the energy of the signal estimated by the FFT 404.

For example, if a 1024 point FFT is employed to detect the interference, the frequency range is divided into 1024 bins and the 1024 point FFT may be used to determine energy at each of the 1024 bins. The output of the FFT 404 reports the component of the input signal at the each of the bins. In one embodiment, the energy is determined by squaring the amplitude. The output of the FFT 406 is used to perform the energy estimate. The selection of the bin depends on the nature of measurement required. In one embodiment, the entire frequency bins are measured in the AGC operation while estimating signal energy at different points in the chain. By combining the energy estimate from the FFT and the knowledge of the response of the filter chain, the power-level at any node in the signal chain can be estimated. In one embodiment, the FFT 404 is used for coarse, less frequent sensing.

FIGS. 5A and 5B illustrates an interference frequency detection using a Goertzel algorithm according to various embodiments herein. In an embodiment, the Goertzel algorithm is used to detect (i) an interference frequency/blocker, and (ii) an interference frequency location at a targeted points (i.e. frequency bins). The Goertzel algorithm estimates energy at one or more selected frequency bins. In an embodiment, the Goertzel algorithm is used for low complexity sensing. The Goertzel algorithm provides the spectral estimate at a single frequency bin. The Goertzel algorithm includes two programmable controls as follows: (i) a first control that controls a frequency resolution computation and (ii) a second control that selects at least one frequency bin for which a frequency transform is to be computed. In one embodiment, the blocker/interference in a frequency range of interest could be either a pure tone, or a modulated signal. If the signal energy to be measured has a modulated nature, and hence could be spread over one or more bins, the interference measurement is done over a range of bins that the signal is spread over. In one embodiment, as depicted in FIG. 5A in case the blockers/interference are modulated signals, a Goertzel block/module 504 is configured in a multi shot mode.

In one embodiment, the Goertzel block/module 504 receives the signal from an analog front end 502. In the multi shot mode as depicted in FIG. 5A, the measurement needs to be done over a range of frequency bins that the signal is spread over and accordingly multiple measurements (i.e. Goertzel output 506) are obtained from the Goertzel block/module 504 and multiple measurements are added to obtain the energy estimate of the interfering signal. The Goertzel algorithm provides a more frequent measurement. In one embodiment, the Goertzel algorithm is used to detect the interference frequency at particular frequency bins of a signal. FIG. 5B depicts energy estimation using Goertzel block/module 504 in the case the blocker of interest is a pure tone, where the Goertzel block 504 is configured in a single shot mode. The Goertzel output 508 of the Goertzel block 504 is compared to a threshold to decide if there is a significant energy. In one embodiment, the Goertzel block/module 504 receives a frequency bin from an analog front end 502. The threshold is based on the circuit design and is affected by the designed operating voltage levels and filters that are in the signal chain prior to the point of measurement.

Figure 6A:
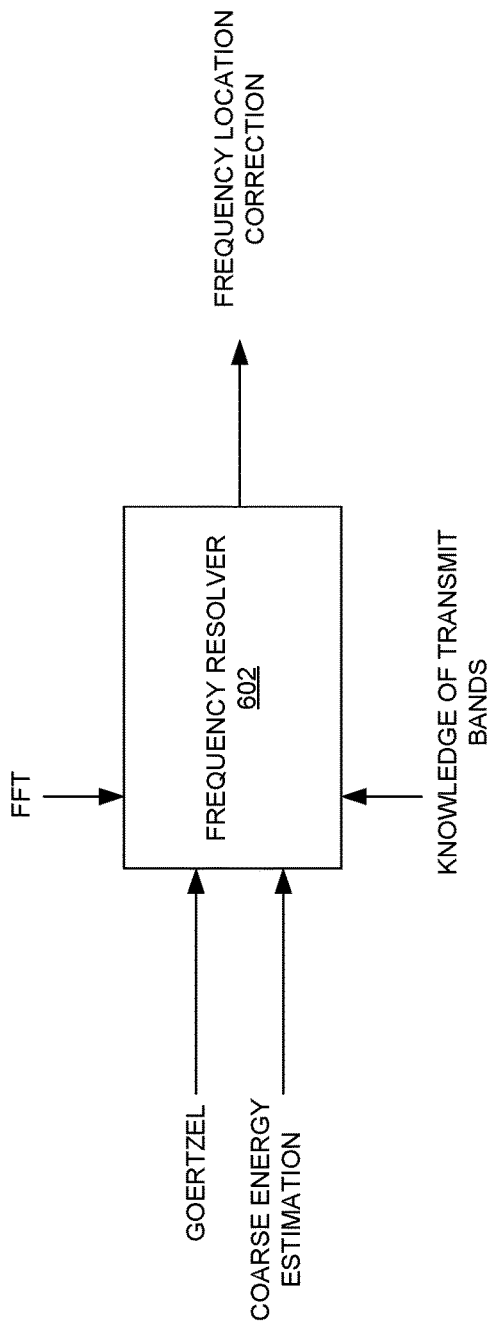
FIG. 6A illustrates reconstruction of a signal power profile of an input signal by removing ambiguity using a frequency resolver according to an embodiment herein.
Figure 6B:
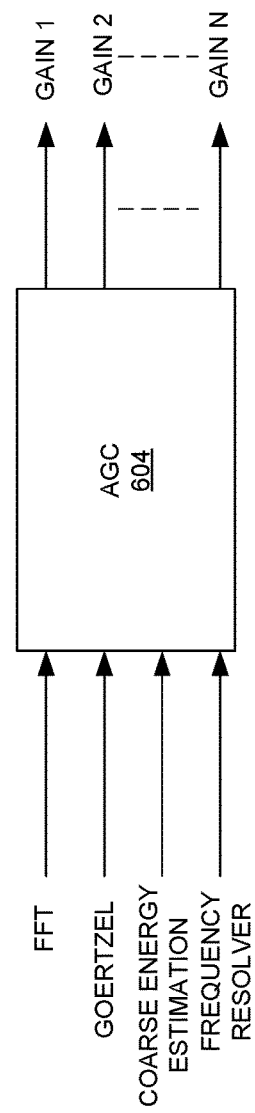
FIG. 6B illustrates selection of optimum mode to obtain a gain using an AGC according to an embodiment herein

The interference signal/frequency blocker is estimated in the input signal using at least one of the Fast Fourier transform, the Goertzel algorithm, and the energy measurements/power level estimation. Once the interference and the frequency blockers is estimated in the input signal, a frequency resolver 602 removes the ambiguity of frequency of one or more signal components and reconstructs a signal power profile of the input signal at various locations with knowledge of a filtering response of signal processing chains, as depicted in FIG. 6A. In an embodiment, the frequency resolver 602 reconstructs a signal power profile of the input signal by correcting the interference frequency location. The frequency resolver 602 (a) obtains output of (i) the FFT, (ii) the Goertzel, (iii) energy estimation module and (iv) knowledge of transmit bands which describes interference at certain frequency, and (b) removes the ambiguity of frequency of one or more signal components and reconstructs a signal power profile. In one embodiment, the ambiguity in a actual frequency of the signal is removed by relating the signal whose frequency measured after sampling appears in an invalid region (e.g. a region of frequencies that do not directly map to known components (i.e. the one or more signal components) of the input signal) and further whose real frequency value is mapped to most likely valid transmit frequency by considering other aliasing frequencies. An automatic gain controller (i.e., AGC) 604 selects the optimum mode using reconstructed signal power profile and knowledge of a circuit non linearity to maintain a gain. The AGC 604 (a) obtains output of (i) the FFT, (ii) the Goertzel, (iii) energy estimation module and (iv) frequency resolver 602, and (b) selects optimum mode to maintain a gain as depicted in FIG. 6B. In one embodiment, the optimum mode includes (i) maximum drive strengths of different nodes in a circuit as either RMS or amplitude, and (ii) setting the drive strength of certain modules differently based on detected presence of the energy at locations which would cause higher order products to distort signal of interest.

Figure 7:
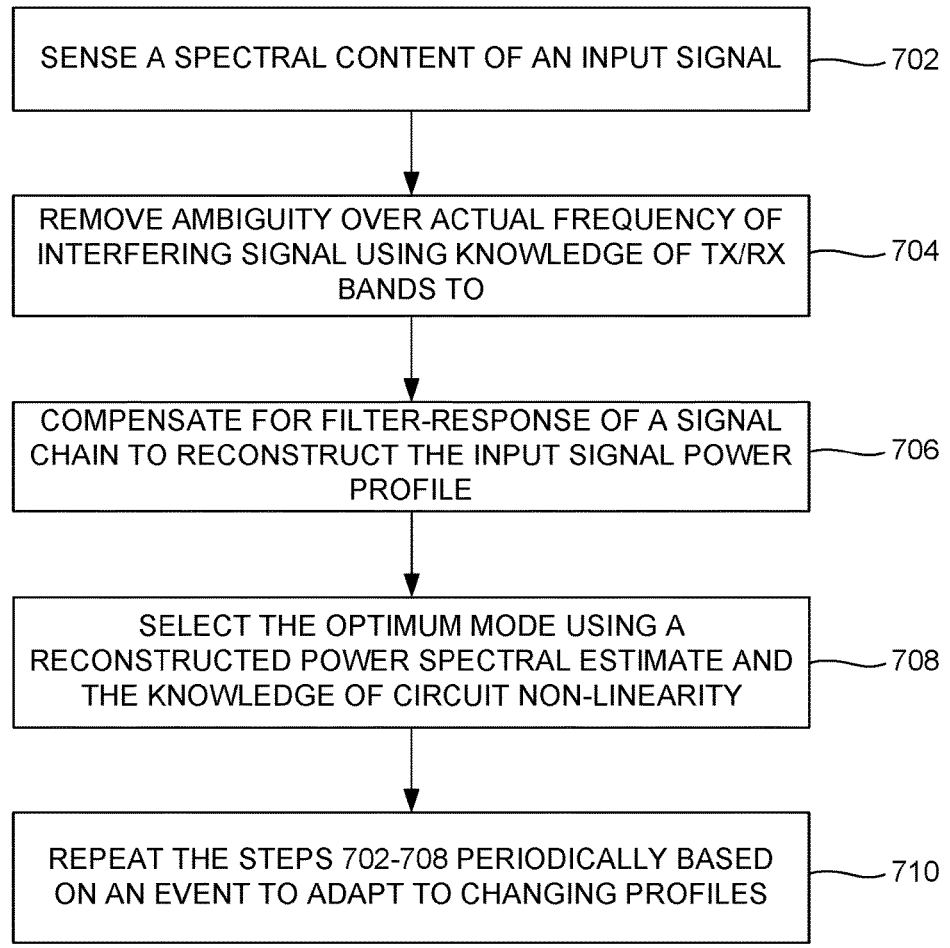
FIG. 7 is a flow diagram illustrating a method of automatic gain control based on signal spectrum sensing, according to an embodiment herein.

FIG. 7 is a flow diagram illustrating a method of automatic gain control based on signal spectrum sensing, according to an embodiment herein. In step 702, a spectral content of an input signal is sensed using at least one of FFT, geortzel algorithm, or power level estimation. The FFT operation may be used to identify the interference and selected output of the FFT operation may be used to perform an energy estimation. The FFT operation is herein described further along with FIG. 4. In an embodiment, the Goertzel algorithm is used to detect (i) an interference frequency/blocker, and (ii) an interference frequency location at a targeted points (i.e. frequency bins). In an embodiment, the Goertzel algorithm is used for low complexity sensing. The Goertzel algorithm provides the spectral estimate at a single frequency bin and includes two programmable controls including (i) a first control that controls a frequency resolution computation and (ii) a second control that selects at least one frequency bin for which a frequency transform is to be computed. The spectral sensing using Goertzel algorithm is herein described further along with FIGS. 5A-5B. In situations where the interference scenario is changing as a function of time (for example when a blocker experiences fading and its power level changes as a function of time), an algorithm to measure the energy/power level estimate is run periodically to track the changes as blockers that were not prominent while experiencing deep fade may affect performance when it is out of the deep fade. In one embodiment, a coarse spectral sensing (sensing spectral content of input signal) may be performed using power detection at different stages (analog/digital). In step 704, the knowledge of the transmit band and the receive band is used to remove ambiguity over actual frequency of the interference signal (ambiguity due to aliasing) and power of the interference signal. In step 706, a filter response of a signal chain is compensated to reconstruct the input signal power profile (power level estimate). In step 708, the reconstructed power level estimate and the knowledge of the circuit non linearity is used to select the optimum mode. In step 710, steps 702 to 708 are repeated periodically based on an event to adapt to changing profiles.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with various types of modifications within the spirit and scope of the appended claims.

What is claimed is:

1. A method for automatic gain control based on signal spectrum sensing and reconstruction at a receiver, said method comprising:
   receiving an input signal through a plurality of analog front end chains and a plurality of digital front end chains;
   estimating an energy of a plurality of signal components of said input signal in a frequency domain, wherein said estimation of said energy comprises detecting (i) said plurality of signal components of said input signal of which some signal components comprise interference and (ii) frequency locations of said signal components comprises said interference in said input signal at a plurality of frequency bins using at least one of (a) power level estimation algorithm, (b) a fast fourier transform or (c) a Goertzel algorithm;
   removing ambiguity of frequency of said plurality of signal components of said input signal;
   reconstructing a signal power profile of said input signal at a plurality of frequency locations with knowledge of a filtering response of a signal processing chain, wherein said signal processing chain comprises said plurality of analog front end chains and said plurality of digital front end chains; and
   selecting an optimum set of gain values based on said reconstructed signal power profile and knowledge of non-linearity of a circuit to control a gain of said input signal, wherein said non-linearity of said circuit is modeled as higher order terms of said input signal that cause energy of said input signal to be generated.

2. The method of claim 1, wherein estimating said energy of said plurality of signal components of said input signal in said frequency domain comprises implementing at least one of
   (i) said fast fourier transform (FFT) that is configured to
      receive said input signal that is processed by said plurality of analog front end chains;
      estimate energy of said plurality of signal components of said input signal at each of said plurality of frequency bins; and
      detect an interference power of said plurality of signal components of said input signal by summing said energy at each of said plurality of frequency bins;
   (ii) said Goertzel algorithm that is configured to
      receive said input signal that is processed by said plurality of analog front end chains;
      estimate energy of said plurality of signal components of said input signal at each of a plurality of selected frequency bins; and
      detect energy estimate of an interfering signal by adding said estimated energy of each of said selected frequency bins; or
   (iii) said power level estimation algorithm at a plurality of filtering stages in said plurality of analog front end chains and said plurality of digital front end chains that is configured to
      receive said input signal that is processed by said plurality of analog front end chains;
      estimate energy of said plurality of signal components of said input signal at a plurality of tap off points in said signal chains; and
      determine a coarse energy distribution of said input signal based on said estimated energy of said plurality of signal components of said input signal at said plurality of tap off points.

3. The method of claim 1, wherein said ambiguity in each frequency of said signal components is removed by relating said signal components whose frequency measured after sampling appears in a region of frequencies that do not directly map to known signal components of said input signal and further whose real frequency value is mapped to most likely valid transmit frequency by considering other aliasing frequencies of said input signal.

4. The method of claim 2, wherein said FFT is implemented for
   estimating a power level at any frequency bin of said input signal by undoing a filtering response of said signal processing chain from said energy of said input signal detected by said FFT.

5. The method of claim 2, wherein said Goertzel algorithm comprises a plurality of programmable controls to (a) control (i) a frequency resolution computation, and (ii) at least one frequency bin for which a frequency transform is to be computed, and (b) sum multiple frequency bins.

6. The method of claim 2, wherein said power level estimation algorithm further detects said frequency locations at said plurality of tap off points in said signal chains.

7. The method of claim 2, wherein said coarse energy distribution of said input signal is determined by
estimating an energy of said plurality of signal components of said input signal at output of each of said plurality of tap off points;
estimating an energy of said plurality of signal components of said input signal at input of each of said plurality of tap off points; and
comparing said energy estimated at said output of each of said plurality of tap off points with said energy estimated at said input at each of said plurality of tap off points to determine said coarse energy distribution of said input signal.

8. The method of claim 7, wherein said method further comprises:
determining (i) an exact frequency location of occurrence of loss of energy and (ii) location of said interference by comparing said energy estimated at said input and said energy estimated at said output of each of said plurality of tap off points at said plurality of filtering stages.

9. The method of claim 1, wherein said optimum set of said gain is controlled using one or more of the following:
(i) maximum drive strengths of said gain at different nodes in said circuit as either Root Mean Square (RMS) or amplitude of said input signal at corresponding nodes; and
(ii) presence of said energy at frequency locations which causes higher order products to distort said input signal of interest.

\* \* \* \* \*